US012644253B2

(12) United States Patent
Dondi

(10) Patent No.: US 12,644,253 B2
(45) Date of Patent: Jun. 2, 2026

(54) PIPE LAYING MACHINE WITH IMPROVED STABILITY

(71) Applicant: SCAIP S.P.A., Parma (IT)

(72) Inventor: Gian Paolo Dondi, Parma (IT)

(73) Assignee: SCAIP S.P.A., Parma (IT)

( * ) Notice: Subject to any disclaimer, the term of this patent is extended or adjusted under 35 U.S.C. 154(b) by 62 days.

(21) Appl. No.: 18/603,577

(22) Filed: Mar. 13, 2024

(65) Prior Publication Data

US 2024/0375916 A1     Nov. 14, 2024

(30) Foreign Application Priority Data

Mar. 17, 2023     (IT) ......................... 102023000005121

(51) Int. Cl.
| | |
|---|---|
| *E02F 9/02* | (2006.01) |
| *B62D 33/063* | (2006.01) |
| *B66C 23/44* | (2006.01) |
| *F16L 1/00* | (2006.01) |

(52) U.S. Cl.
CPC ............ *E02F 9/028* (2013.01); *B62D 33/063* (2013.01); *B66C 23/44* (2013.01); *F16L 1/00* (2013.01)

(58) Field of Classification Search
CPC .. F16L 1/00; F16L 1/024; F16L 1/028; B62D 33/063; E02F 9/028
See application file for complete search history.

(56) References Cited

U.S. PATENT DOCUMENTS

| | | | | | |
|---|---|---|---|---|---|
| 4,650,017 | A | * | 3/1987 | Pelletier ................. | E02F 9/121 |
| | | | | | 180/41 |
| 5,337,847 | A | * | 8/1994 | Woods ................. | A01G 23/083 |
| | | | | | 180/41 |
| 6,105,699 | A | | 8/2000 | Hinds | |
| 6,173,973 | B1 | | 1/2001 | Robinson | |

(Continued)

FOREIGN PATENT DOCUMENTS

| | | | | | | |
|---|---|---|---|---|---|---|
| AU | | 2007274754 | A1 | * | 1/2008 | ............. B66C 23/76 |
| CA | | 2631480 | A1 | * | 11/2009 | ................ E02F 3/38 |

(Continued)

OTHER PUBLICATIONS

Italian Search Report From Priority Application 102023000005121, Dated Sep. 27, 2023.

*Primary Examiner* — Frederick L Lagman
(74) *Attorney, Agent, or Firm* — Carmel Patent Agency; Robert Ballarini

(57) ABSTRACT

A pipe-laying machine for laying pipes in the construction of pipelines includes: a central body to which two track assemblies are mechanically connected, the central body being adapted to support a base on which at least a boom is installed to move/lift/position the pipe; lifting means for handling the boom having a main winch; and an operator control cab. The boom having a first end pivoted on the base and a second end, connected to a control cable of the lifting means to wind/unwind itself on the main winch in order to rotate said boom carrying the second end away from/towards the ground. Between the base and central body, a levelling mechanism is interposed to tilt the base with respect to the track assemblies, according to a longitudinal axis parallel to and/or according to a transverse axis orthogonal to the direction of advancement of the track assemblies.

13 Claims, 8 Drawing Sheets

(56) References Cited

U.S. PATENT DOCUMENTS

| | | | | |
|---|---|---|---|---|
| 6,241,263 | B1 * | 6/2001 | Hicks | B60G 9/02 |
| | | | | 280/6.154 |
| 6,540,095 | B2 * | 4/2003 | Haringer | B66C 23/76 |
| | | | | 212/242 |
| 6,609,581 | B2 * | 8/2003 | Vaile | B62D 55/075 |
| | | | | 280/6.15 |
| 6,893,189 | B2 * | 5/2005 | Matsushita | B66C 23/44 |
| | | | | 212/289 |
| 7,832,740 | B2 | 11/2010 | Kim et al. | |
| 7,896,178 | B2 | 3/2011 | Davis | |
| 8,070,170 | B2 * | 12/2011 | Crawford | B62D 55/116 |
| | | | | 280/6.154 |
| 10,220,921 | B1 * | 3/2019 | McConnell | B66C 23/705 |
| 10,526,054 | B2 * | 1/2020 | McConnell | B60P 1/5428 |
| 11,584,456 | B2 * | 2/2023 | Selvam | E21B 7/024 |
| 2010/0108632 | A1 * | 5/2010 | Davis | F16L 1/06 |
| | | | | 212/294 |
| 2019/0023540 | A1 * | 1/2019 | Pletz | B66C 23/80 |
| 2019/0168846 | A1 | 6/2019 | Mcconnell | |
| 2019/0357422 | A1 * | 11/2019 | Den Hoed | E02F 3/96 |

FOREIGN PATENT DOCUMENTS

| | | | | | |
|---|---|---|---|---|---|
| CN | 201496651 | U | * | 6/2010 | |
| CN | 215285033 | U | | 12/2021 | |
| CN | 115140664 | A | * | 10/2022 | B66C 23/76 |
| EP | 0048307 | A1 | * | 3/1982 | F16L 43/007 |

* cited by examiner

PIPE LAYING MACHINE WITH IMPROVED STABILITY

CROSS-REFERENCE TO RELATED APPLICATIONS

This application claims priority of Italian Patent Application number IT102023000005121, filed Mar. 17, 2023, the contents of which are incorporated by reference herein as if fully set forth.

FIELD OF THE INVENTION

The present invention relates to the field of pipe-laying machines, particularly in the construction of gas, oil and water pipelines.

STATE OF THE ART

Pipe-laying machines are known in the state of the art e.g. for the construction of gas, oil and water pipelines.

The typical operation of the pipe-laying machine includes the lifting, transport and lowering of the pipe.

Said machines are usually tracked, so they are movable on the ground by means of a pair of tracks.

Said machines are equipped with a lifting boom that is generally lateral with respect to the direction of advancement of the tracks.

Said machines normally comprise a counterweight that extends from the opposite side of the boom.

Said machines also include a cab to accommodate the operator.

For example, in the construction of pipelines, the ground is generally excavated to create a ditch in which pipes are placed to form said pipelines.

Generally, said pipe-laying machines move laterally to the excavation in order to lay the pipes, so the tracks move substantially parallel to the excavation.

In most cases the boom is lateral to the advancement direction precisely so that it can be deposited in the excavation alongside the tracks.

Generally, both the boom and the cab are fixed and not movable with respect to the tracks.

The only movement permitted is that of the boom required to pick up, lift and deposit the pipe; in fact, said boom is rotatably pivoted/hinged, generally directly outside the track, on its load-bearing structure. In particular, the boom comprises a first end pivoted to the load-bearing structure of the track and a second end connected to a cable adapted to be wound around a main winch to rotate said boom, bringing the second end away from/towards the ground.

Said pipe-laying machines are able to work well on flat terrain, whereas when they have to work on land with steep slopes, they often run the risk of tipping over.

In such cases, it is only the dimensioning of the counterweight that provides the limit to the maximum acceptable slope.

In fact, the positioning and weight of the counterweight defines the position of the machine's center of gravity and therefore its tilting limit.

The inclination that a pipe-laying machine has to face on certain sites can be either longitudinal, i.e. in the direction of advancement of the tracks, or transverse, i.e. orthogonal to the advancement of the tracks.

For example, document U.S. Pat. No. 7,896,178B2 shows a pipe-laying machine working on land with a longitudinal slope.

In this case, compensation is achieved not only by the counterweight, but also by the design of the boom, which comprises a pulley block and a cable supporting a load block.

The pulley block is pivoted to partially compensate for the slope, thus keeping part of the cable and the load block aligned with one direction of the force of gravity.

Therefore, known pipe-laying machines are only able to adapt in a very limited way to the different types of terrain in which they have to operate and not in a flexible manner.

SUMMARY

The technical problem underpinning the present invention is that of providing a pipe-laying machine in particular in the construction of gas, oil and water pipelines, structurally and functionally conceived to overcome one or more of the limits set out above with reference to the aforementioned prior art.

In the context of the aforementioned problem, one of the main purposes of the invention is to develop a pipe-laying machine, particularly in the construction of gas, oil and water pipelines, that can adapt to the slope of the terrain in which it is to operate.

A further aim of the invention is also to make a pipe-laying machine available to the state of the art, particularly in the construction of gas, oil and water pipelines, as part of a flexible solution to the various operating situations and at a fairly contained cost.

In particular, the invention provides for a pipe-laying machine, in particular in the construction of gas, oil and water pipelines, comprising a central body to which two track assemblies are mechanically connected, for its movement said central body being adapted to support a base on which at least one boom is installed configured to move/lift/position the pipe, lifting means for handling the boom comprising a main winch and a control cab suitable to house an operator.

Said boom comprises a first end, preferably pivoted on the base, and a second end, preferably connected to a control cable of the lifting means.

Said control cable is preferably adapted to wind/unwind itself on the main winch in order to rotate said boom carrying the second end away from/towards the ground.

Preferably a levelling mechanism is interposed between said base and said central body in order to tilt said base with respect to the track assemblies.

Preferably, said levelling mechanism is adapted to tilt said base according to a longitudinal axis oriented in the direction of advancement of said track assemblies and/or according to a transverse axis orthogonal to the direction of advancement of said track assemblies.

Preferably, the levelling mechanism comprises a first rotation device rotatable according to the transverse axis and/or a second rotation device rotatable according to the longitudinal axis.

Advantageously, the first rotation device is placed below the second rotation device towards the support area of the track assemblies.

Preferably, the first rotation device comprises a first structure rotatably pivoted on the central body.

Preferably, the second rotation device comprises a second structure rotatably pivoted on the first structure of the first rotation device.

Preferably the base is mechanically connected to the second structure of the second rotation device.

In particular, the levelling mechanism may comprise a first and a second piston, configured to rotate both the first rotation device and the second rotation device.

Preferably the first and second piston comprise a lower end pivoted to the central body and an upper end pivoted to the second structure.

According to an aspect of the invention, the first and second piston are configured to move symmetrically in the same extended or retracted position.

In doing so, they rotate the first device about the transverse axis.

According to a further aspect of the invention, the first and second piston are configured to move to a different extended or retracted position by moving independently of each other.

In doing so, they rotate the second rotation device according to the longitudinal axis.

Optionally, the first rotation device rotates about the transverse axis which is positioned beyond the centerline of the length of the track assembly towards the front of the pipe-laying machine considering the front-end of the track assembly.

Optionally, the second rotation device rotates about the longitudinal axis, which is positioned inclined with respect to the support area of the track assembly and incident towards the front of the pipe-laying machine when the base is parallel to the support area of the track assemblies.

Advantageously, the base can be mounted rotatably on the levelling mechanism in particular with respect to an axis of rotation orthogonal to the base.

Preferably, the pipe-laying machine comprises a rotating device preferably interposed between the levelling mechanism and the base configured to rotate said base about an axis of rotation orthogonal to the base.

Preferably, the rotating device is mechanically connected below the second rotating device and above the base. Preferably the first end of the boom is pivoted on the base near a perimeter side.

Preferably, the second end of the boom comprises second lifting means adapted to engage with the pipe.

In particular, said second lifting means of the pipe comprise a secondary winch and are preferably installed on the base.

Preferably the pipe-laying machine may comprise a frame mechanically connected to an upper surface of the base, said frame being adapted to support the main winch and preferably the secondary winch.

Preferably the frame is positioned to the side of the control cab.

Preferably a counterweight is installed on the base to balance the weight of the boom and/or the suspended load.

Preferably the levelling mechanism is configured to tilt so that the center of gravity of the machine falls within the support area of the track assemblies.

The subject matter of the invention is also a method for laying pipes, particularly in the construction of gas, oil and water pipelines, which comprises adapting the machine to the inclination of the ground by tilting the base with respect to the area where the track assemblies rest on the ground.

Preferably, said inclination takes place along a longitudinal axis oriented in the direction of advancement of said track assemblies and/or along a transverse axis orthogonal to the direction of advancement of said track assemblies.

During the inclination, it is preferable for said base to remain horizontal whatever the slope of the support area, i.e. the ground.

Preferably, said method involves rotating the base in particular with respect to the axis of rotation orthogonal to the base itself.

Preferably, the method involves rotating the base about the longitudinal axis and/or the transverse axis and/or about the axis of rotation so that the center of gravity of the machine falls within the support area of the track assemblies.

Preferably, the method involves picking and/or laying the pipe when the base is rotated about the axis so that the boom is arranged transverse to the direction of travel of the track assemblies.

Preferably, the method involves moving the first and second pistons symmetrically in order to rotate the base about the transverse axis. Preferably, the method involves moving the first and second pistons asymmetrically to rotate the base about the longitudinal axis.

These and other objects are reached by the characteristics of the invention set forth in the independent claims. The dependent claims outline preferred and/or particularly advantageous aspects of the invention.

Said objects and advantages are all achieved by the pipe-laying machine in particular in the construction of gas, oil and water pipelines covered by this invention, which is characterized by the following claims.

BRIEF DESCRIPTION OF THE DRAWINGS

These and other features will be more apparent from the following description of certain embodiments illustrated by way of non-limiting example in the accompanying drawings.

DETAILED DESCRIPTION OF THE PREFERRED EMBODIMENTS

Figure 1:
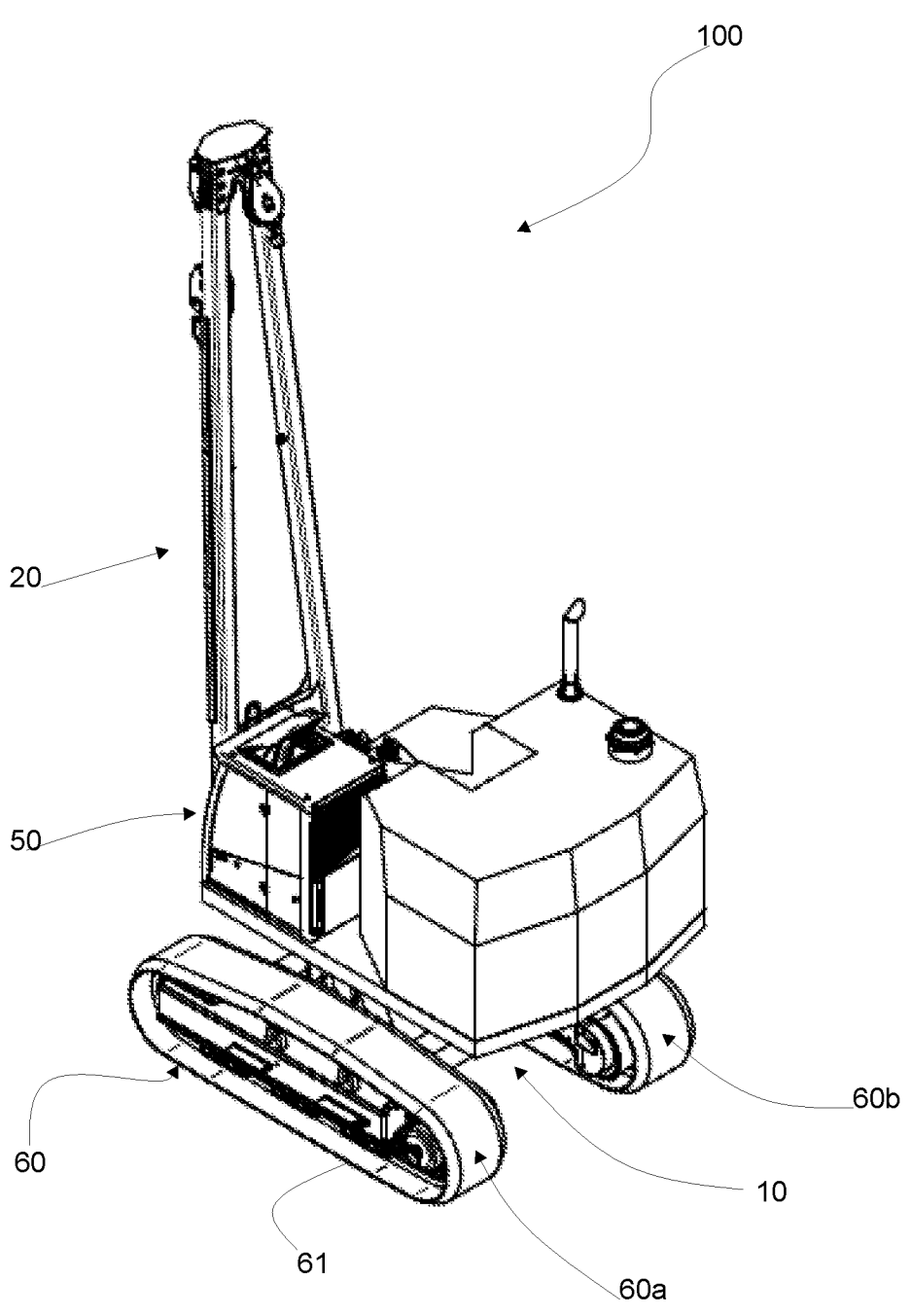
FIG. 1: illustrates an axonometric view of a pipe-laying machine.
Figure 2:
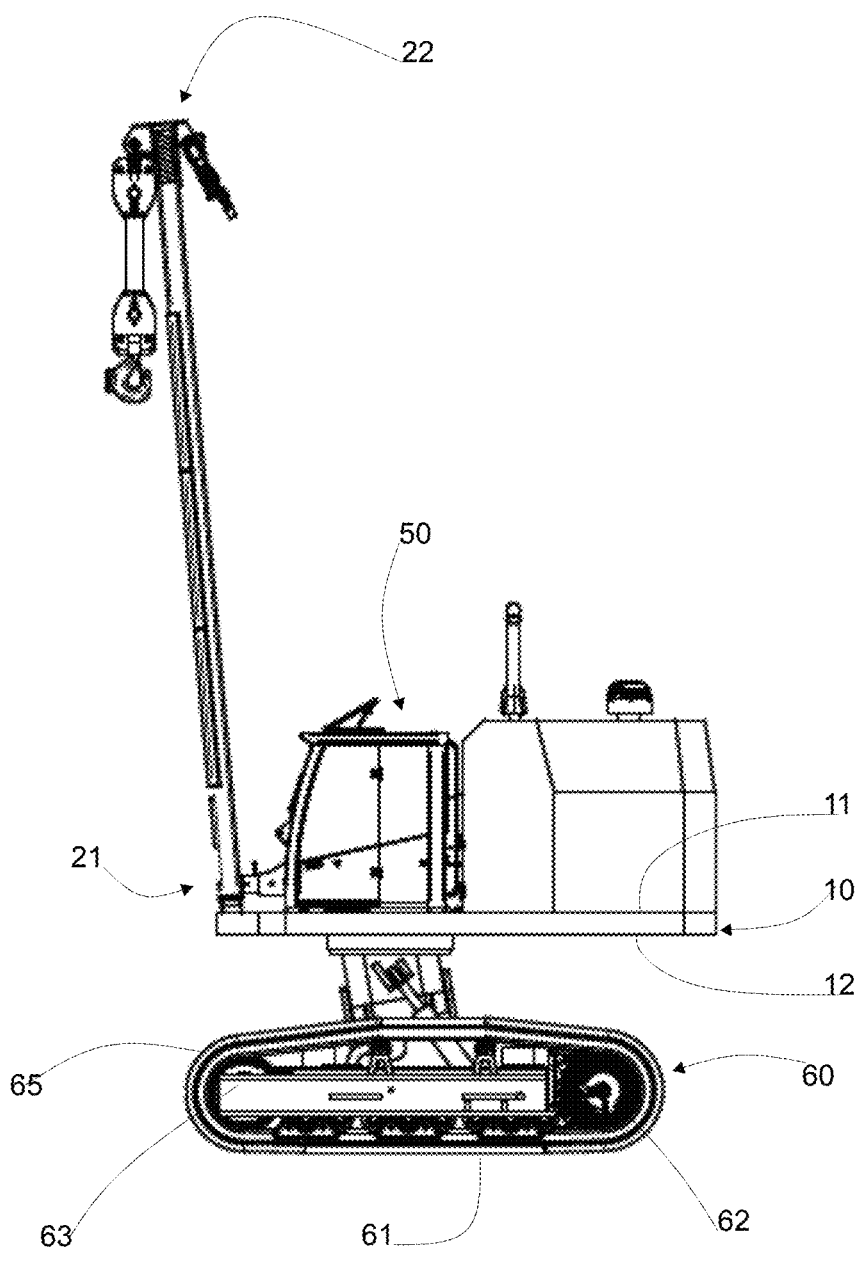
FIG. 2: illustrates a side view of a pipe-laying machine.

With particular reference to the figures, the pipe-laying machine 100 for laying pipes is shown, in particular in the construction of gas, oil and water pipelines.

Said pipe-laying machines 100 intervene after the excavation has been performed in which the pipelines are to be laid.

According to a preferred embodiment said machine 100 comprises a central body 30 to which two track assemblies 60 are mechanically connected for the movement of the machine 100.

Said track assemblies 60 are particularly suitable for movement on difficult terrain and when the loads to be handled are large, as they reduce the risk of slipping and facilitate travel even in critical conditions.

Generally, the two track assemblies 60, are arranged on either side of the central body 30 and parallel to each other.

Generally, said track assemblies 60 are connected to a motor.

In particular, each track assembly 60 consists of a "track carriage", or undercarriage 60a, 60b, on which a corresponding track 65 is mounted.

The undercarriage 60a, 60b further comprises a drive wheel 62 and an idle wheel 63 or tensioner.

The drive wheel 62 is preferably arranged to the rear in relation to the direction of travel of the machine 100.

Preferably said central body 30 is adapted to support a base 10 of the machine 100.

Specifically, on said base 10 at least the following are installed:

preferably a boom 20 configured to move/lift/lay the pipe, preferably lifting means 70 for handling the boom 20, comprising a main winch 71, preferably a control cab 50 suitable to house an operator.

Preferably, the base 10 also houses the power unit for driving the pipe-laying machine 100.

According to a preferred embodiment depicted in the figure, the base 10 has a planar structure that extends above the track assemblies 60.

In particular, the base 10 comprises a lower surface 12 facing the ground and mechanically connected to the central body 30 and an upper surface 11 opposite the previous one.

Preferably said base 10 has a width that is substantially equal to the outer width defined by the track assemblies 60.

Preferably said base 10 has a length that is substantially similar to the length of the track assemblies 60 or optionally longer.

According to an advantageous embodiment, the boom 20 comprises a first end 21 pivoted on the base 10 preferably near a perimeter side 15.

The term pivoted refers to the possibility of rotation about a single-axis pivot, e.g. a hinge or a double-axis pivot.

Therefore, the boom 20 is rotatable with respect to the base 10 at the first end 21 thereof.

In particular, the main winch 71 has a horizontal axis and comprises a rotating drum 71b preferably driven by a motor such as a hydraulic motor.

The main winch 71 comprises a control cable 71a that can be wound around the drum 71b.

Preferably a second end 22, of said boom 20 opposite to the first end 21, is connected to the control cable 71a, of the lifting means 70, adapted to wind/unwind itself on the drum 71b of the main winch 71 to rotate said boom 20 carrying the second end 22 away from/towards the ground.

The use of winch-type lifting means 70 is particularly advantageous as it allows a more favorable center of gravity than the use of hydraulic cylinder-type lifting means.

In fact, the weight of the winch-type lifting means 70 is discharged on the base 10 and does not bear on the boom 20 as is the case when the boom 20 is moved by means of the cylinder; furthermore, the cylinder to connect to the boom 20 protrudes from the track assemblies 60, whereas the winch-type lifting means 70 are positioned so that their center of gravity remains within the track assemblies 60.

This solution is simple and inexpensive, and allows sufficient force to perform the movement of the boom 20 without the need for other systems such as hydraulic cylinders.

Second lifting means 75 can be provided at said second end, adapted to engage with the pipe 200.

According to an aspect of the invention, said second lifting means 75 preferably comprise a hoist 78 pivoted on the second end 22 of the boom 20.

Preferably a coupling element 78a is hung on said hoist 78 away from the end 22.

At said coupling element 78a, one or more straps or bands configured to engage with the pipe, for example by embracing a portion of its outer surface, may be installed in a removable manner.

Said second lifting means 75 of the pipe 200 can operate independently of the lifting means 70.

Therefore, said second lifting means 75 of the pipe 200 allow the pipe to be raised or lowered even if the boom 20 is not rotating.

Preferably said second lifting means 75 comprise a secondary winch 76.

In particular, the secondary winch 76 has a horizontal axis and comprises a rotating secondary drum 76b preferably driven by a motor such as a hydraulic motor.

The secondary winch 76 comprises a secondary control cable 76a that can be wound around the secondary drum 76b.

Said secondary control cable 76a extends to the hoist 78 and engages in a plurality of pulleys of the hoist 78, to carry the coupling element 78a towards/away from the second end 22 of the boom 20.

In particular, unwinding the secondary control cable 76a from the secondary drum 76b lowers the coupling element 78a, whereas winding the secondary control cable 76a around the secondary drum 76b raises the coupling element 78a, to respectively lower or raise the pipe.

Advantageously the second lifting means 75 are preferably installed on the base 10.

Figure 7:
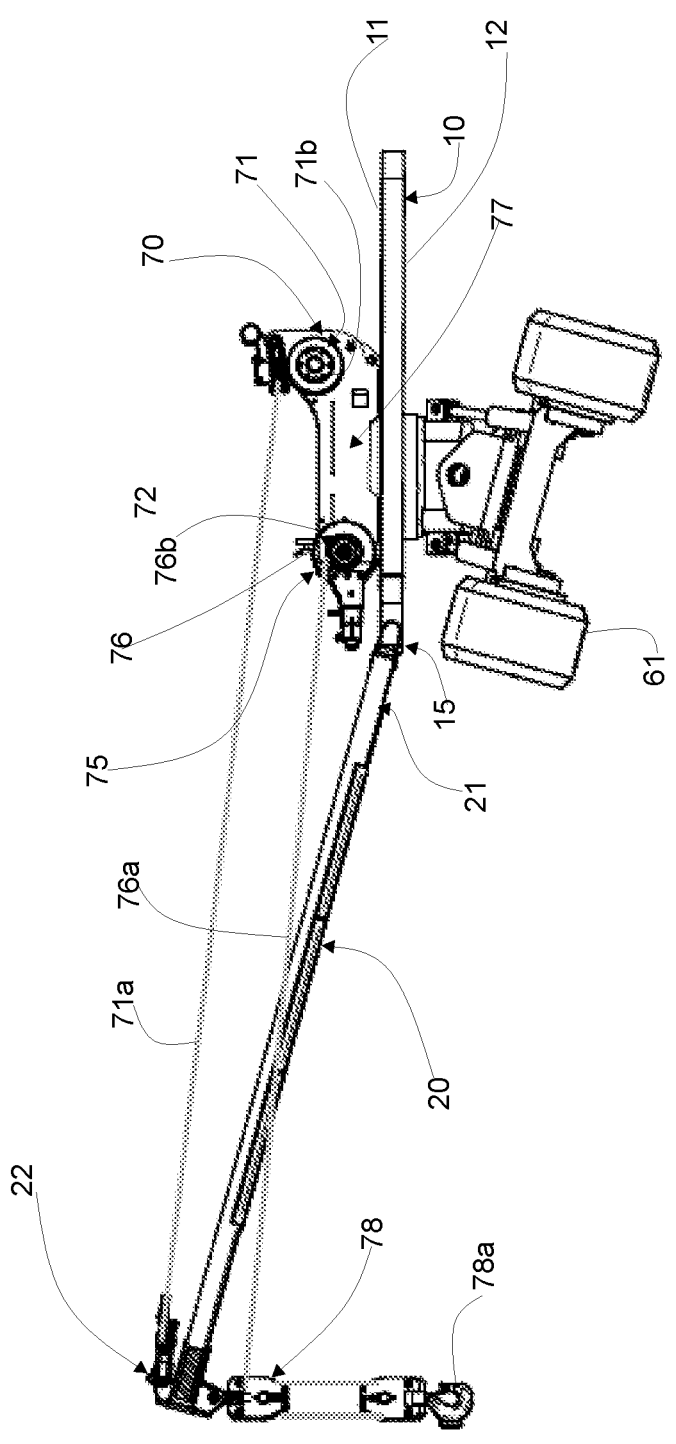
FIG. 7: illustrates a front view of a pipe-laying machine with a ground slope along the axis transverse to the tracks and with the boom positioned lateral to the advancement direction, and highlighting the winches for lifting the boom and the pipe.

In a preferred embodiment depicted in FIG. 7, the pipe-laying machine 100 comprises a frame 77 installed on the base 10, in particular mechanically connected to an upper surface 11 of the base 10.

Said frame 77 is configured to support the main winch 71 and preferably also the secondary winch 76.

This simplifies the construction by ensuring that the winches 71 and 76 discharge their weight onto the base 10 and do not weigh down the boom 20.

Said frame 77, as depicted in FIG. 7, provides for the secondary winch 76 to be positioned in front of the main winch 71, with respect to the boom 20.

The purpose of this positioning is to prevent the secondary control cable 76a and the main control cable 71a from interfering with each other to the point of touching.

Furthermore, preferably the main winch 71 is in a higher position on the base 10 with respect to the secondary winch 76.

This allows the maximum possibility of lowering the boom 20 without interfering with the dimensions of the second lifting means 75.

An aspect of the invention is that the frame 77 is positioned to the side of the control cab 50.

a. This optimizes the space on the base 10, while also allowing the operator to control the unwinding of the secondary control cable 76a in particular.

The boom 20 may be a framework 25 preferably comprising one or more primary structural elements 24 and preferably one or more reinforcing cross members 23.

Said framework 25 may be symmetrical, i.e. said two primary structural elements 24 may extend from the base 10, being inclined at the same angle with respect to a vertical axis Z to the base 10.

The framework 25 may also be asymmetrical, i.e. said two primary structural elements 24 may extend from the base 10, being inclined at different angles with respect to the vertical axis Z to the base 10.

The primary structural elements 24 can be made from square or rectangular steel tubes.

Figure 3:
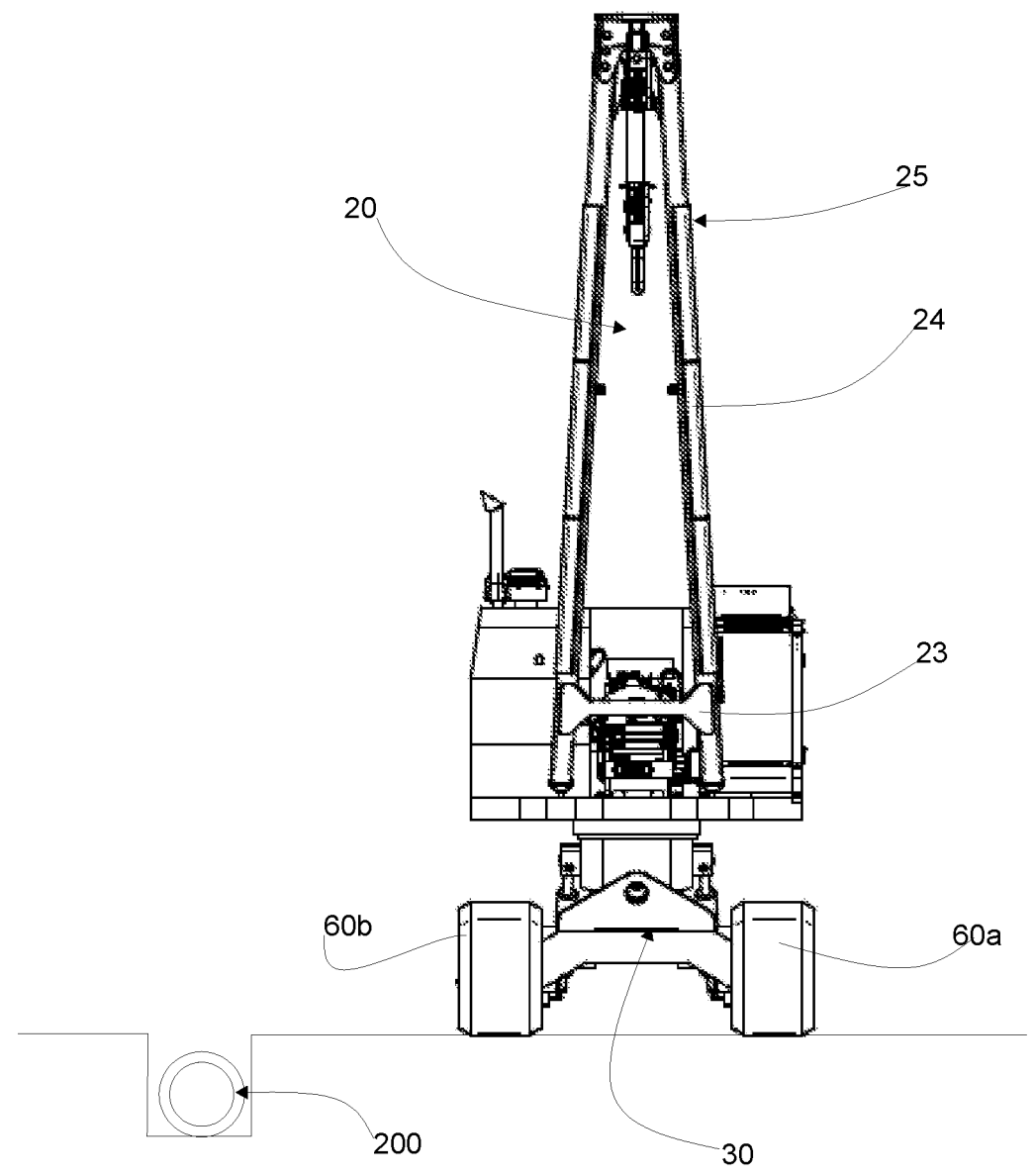
FIG. 3: illustrates a front view of a pipe-laying machine.
Figures 4A, 4B:
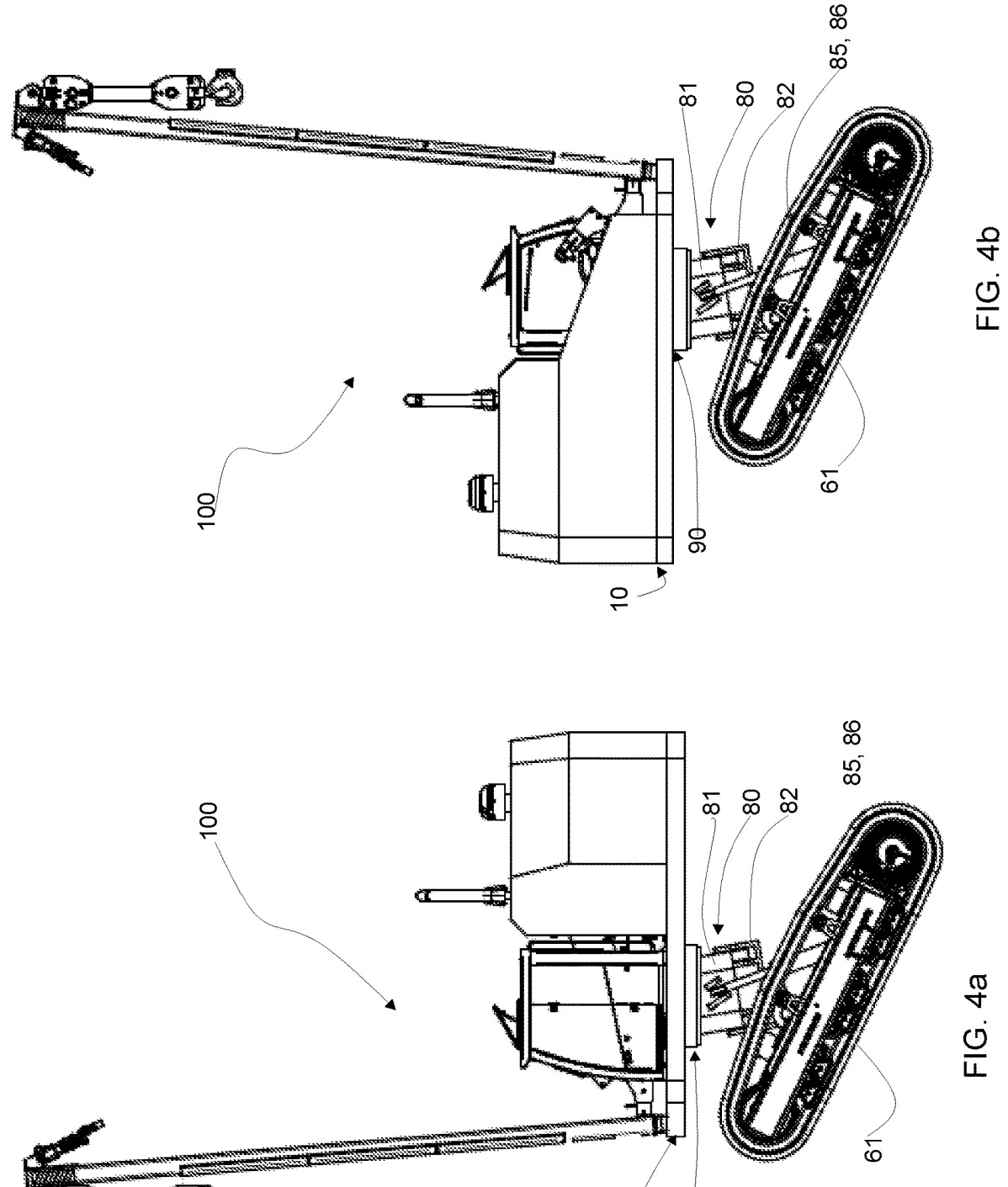
FIG. 4a, 4b: illustrates a side view of a pipe-laying machine with two ground slopes along the longitudinal axis of the tracks and with the boom arranged in the advancement direction.
Figure 5B:
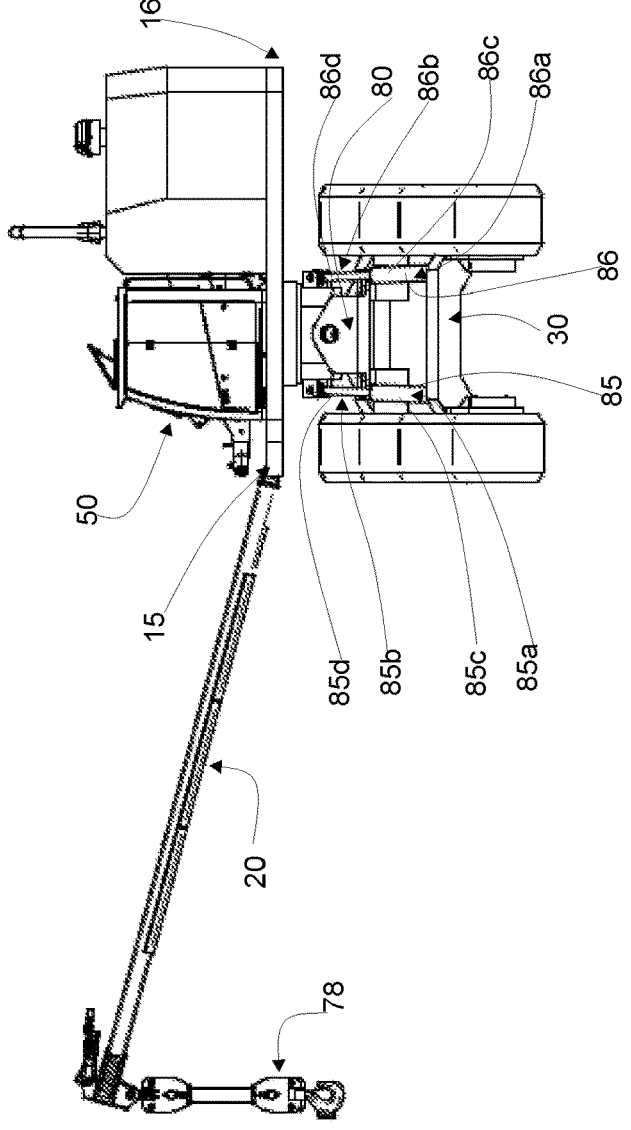
FIG. 5a, 5b: illustrates a side and front view of a pipe-laying machine with a ground slope along the axis longitudinal to the tracks and with the boom arranged lateral to the advancement direction.
Figure 5A:
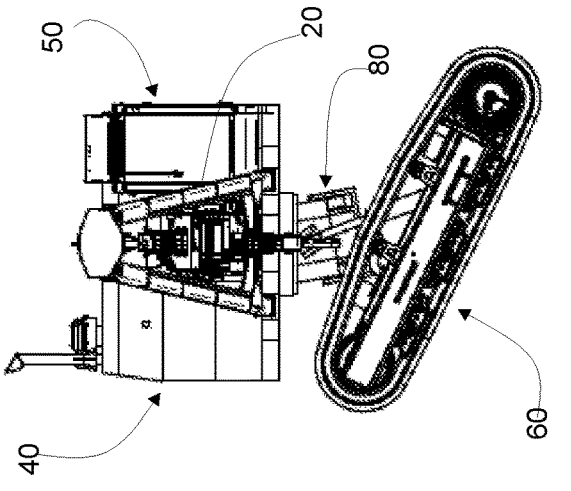
Figure 6B:
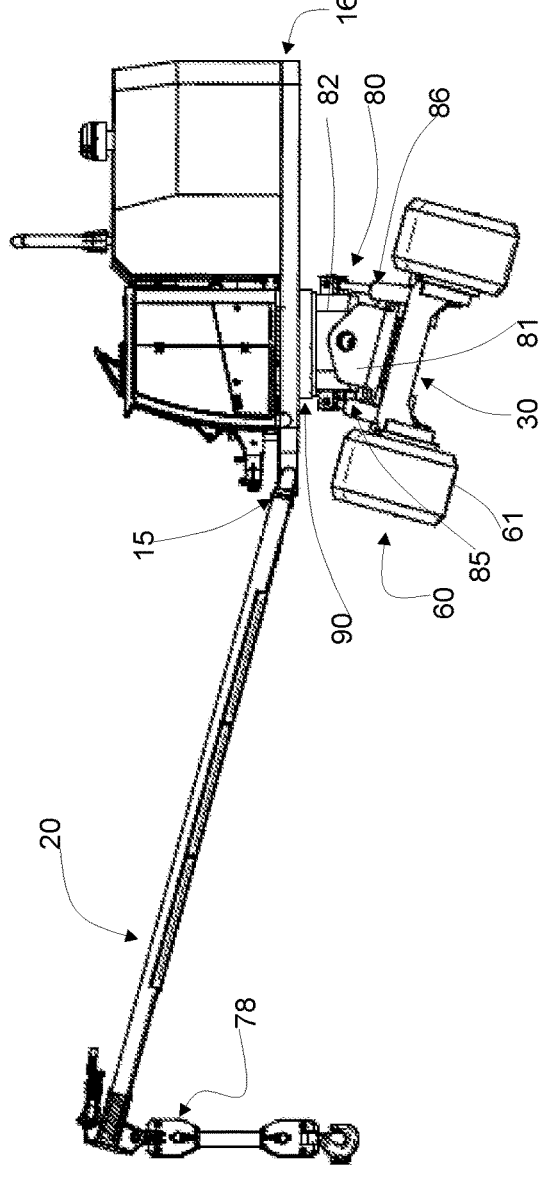
FIG. 6a, 6b: illustrates a side and front view of a pipe-laying machine with a ground slope along the axis transverse to the tracks and with the boom positioned lateral to the advancement direction.
Figure 6A:
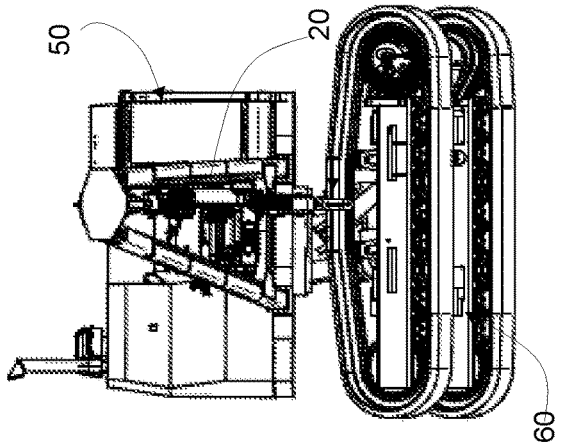

FIG. 3 shows a boom 20 with a framework 25 comprising two primary structural elements 24 and a cross member 23 such that it takes on a symmetrical A-shape.

According to an aspect of the invention, the control cab 50 comprises walls, ceiling and windows to protect the operator from the weather and allow visibility to the operator.

The cab is preferably positioned on the upper surface 11 of the base 10.

The positioning of the cab 50 on the base 10 can allow the operator an unobstructed view to the front, left and/or right.

In possible variants, the control cab 50 could also be fitted with a support that rotates by a few degrees with respect to the base 10 in order to facilitate the overall view and improve driving ergonomics.

Advantageously, the control cab 50 also comprises a seat, operating instruments and operating controls, not shown in the figure.

According to a preferred embodiment, the pipe-laying machine 100 further comprises a counterweight 40 installed on the base 10.

Said counterweight 40 is intended to balance the weight of the boom 20 and/or the suspended load.

The counterweight 40 is preferably positioned on the base 10, opposite the perimeter side 15 on which the boom 20 is pivoted.

The subject matter of the invention is to provide a machine 100 in which a levelling mechanism 80 is interposed between said base 10 and said central body 30.

In particular, said levelling mechanism 80 is configured to tilt said base 10 with respect to the track assemblies 60 and thus to the ground.

Preferably, the base can be tilted according to a longitudinal axis Y oriented in the direction of advancement of said track assemblies 60 and/or according to a transverse axis X orthogonal to the direction of advancement of said track assemblies 60.

A simplified embodiment could involve tilting the base 10 in only one of the two longitudinal Y or transverse X directions.

According to a complete embodiment that makes the machine 100 usable on all terrains, the base 10 is tilted in both the longitudinal Y and transverse X directions.

In particular, to perform said inclinations, said levelling mechanism 80 comprises a first rotation device 81 rotatable according to the transverse axis X and/or a second rotation device 82 rotatable according to the longitudinal axis Y.

An advantageous embodiment shown in the figure is that the first rotation device 81 is placed below the second rotation device 82 towards the support area 61 of the track assemblies 60. This arrangement is geometrically advantageous in that it allows the levelling mechanism 80 to tilt at predefined angles without interfering with the track assemblies 60.

Preferably the transverse axis X is positioned in the transverse direction and can be positioned at the centerline of the length of the track assembly 60.

In particular, the figures show an advantageous embodiment in which the transverse axis X is positioned beyond the centerline of the length of the track assembly 60 towards the front of the pipe-laying machine 100 considering the front-end of the track assembly 60.

This allows the upper part of the machine 100 to tilt to the desired angle without hitting the track assembly 60.

Preferably the transverse axis X is positioned below the height of the track assembly 60, preferably between its centerline and its upper surface.

Preferably the longitudinal axis Y is positioned inclined to the support area 61 of the track assembly 60 and incident to the front of the pipe-laying machine 100 when the base 10 is parallel to the support area 61.

This configuration makes it possible to have the center of gravity closer to the ground and therefore more favorable to reducing tipping and allowing high inclinations of the machine 100.

In particular, it is possible to achieve an inclination comprised between 0 and 20° or 30° in the longitudinal direction, particularly uphill, and preferably at least 5° downhill.

This difference in inclination between ascent and descent occurs when the transverse axis X is offset from the centerline of the length of the track assembly 60 towards the front of the machine 100.

In the transverse direction, it is possible to achieve an inclination preferably comprised between 0 and 15° on both sides.

In particular, the levelling mechanism 80 is configured to tilt so that the center of gravity of the machine 100 falls within the support area 61 of the track assemblies 60.

This avoids the risk of the machine 100 tipping over.

According to an aspect of the invention, the first rotation device 81 comprises a first structure 81a rotatably pivoted on the central body 30.

This allows the structure 81a to be rotated with respect to the central body 30 attached to the track assemblies 60.

Preferably, the second rotation device 82 comprises a second structure 82a rotatably pivoted on the first structure 81a of the first rotation device 81.

Thus, the second structure 82a and the first structure 81a are mechanically connected to each other in such a way that the second structure 82a assumes all the inclinations generated by the first structure 81a.

Advantageously, the base 10 is mechanically connected to the second structure 82a of the second rotation device 82.

Thanks to this solution, the base 10 assumes all the inclinations generated by both the first structure 81a and the second structure 82a.

The first structure 81a and preferably also the second structure 82a have in the transverse direction a width less than the inside distance of the two track assemblies 60.

This makes it possible to keep the levelling mechanism 80 at least partially embedded within the two track assemblies 60.

This reduces the height of the machine 100 and thus improves its stability.

This ensures maximum flexibility in being able to adapt the base 10 to the various terrain conformations in which the machine 100 has to operate, making it possible to adjust the inclination in both transverse and longitudinal directions of the base 10, and of everything installed on it, in particular the boom 20 and the counterweight 40.

For performing said movements of the first rotation device 81 and/or the second rotation device 82 the levelling mechanism 80 preferably comprises a first and a second piston 85, 86.

According to a preferred embodiment, the first and second pistons 85, 86 are positioned laterally to the first and second structures 81a, 82a, preferably interposed between each track assembly 60 and the first and second structures 81a, 82a.

According to a preferred embodiment depicted in the figures, depending on how the movement of the first and second pistons 85, 86 takes place, it is possible to rotate the first rotation device 81 or the second rotation device 82 or both.

Said first and second piston 85, 86, in particular, comprise a liner 85c, 85c and a rod 85d, 86d configured to extend/retract from the liner 85c, 86c.

In particular, the first and second pistons 85, 86 comprise a lower end 85a, 86a pivoted to the central body 30 and an upper end 85b, 86b pivoted to the second structure 82a.

Said lower end 85a, 86a is preferably positioned below the transverse axis X and preferably in relation to the longitudinal centerline of the track assembly 60 on the opposite side to that where the transverse axis X is located.

Said upper end 85b, 86b is preferably positioned above the longitudinal axis Y.

Figure 8A:
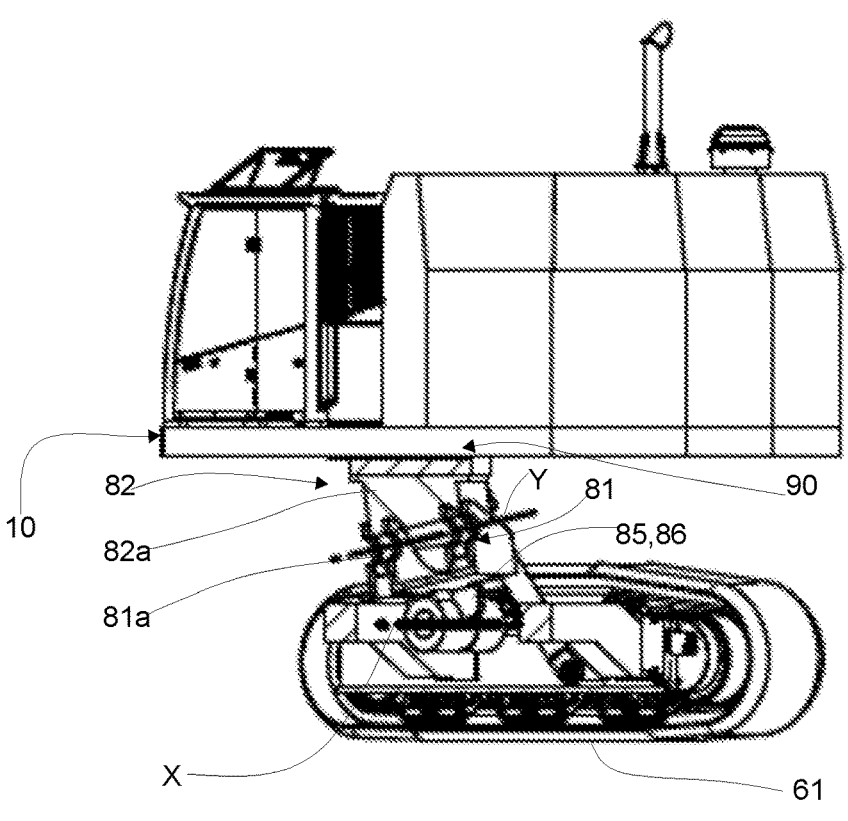
FIG. 8a, 8b: illustrates two detailed views of the levelling mechanism.
Figure 8B:
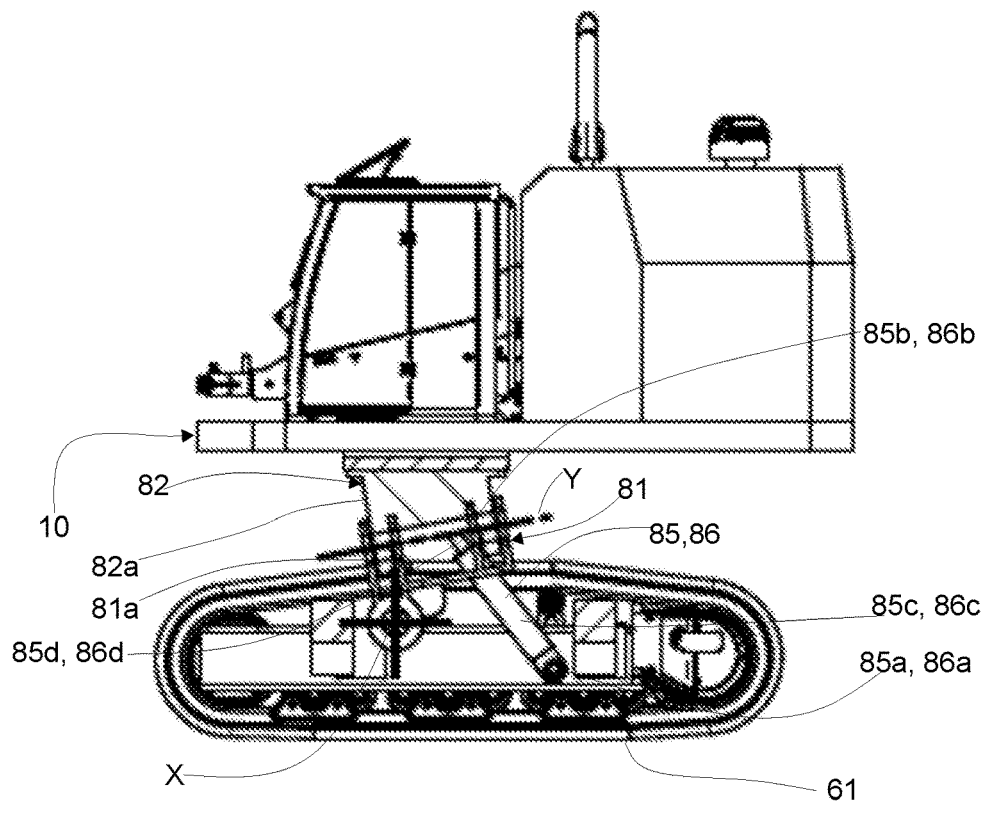

FIGS. 8a, 8b show a preferred embodiment in which the lower end 85a, 86a is at the liner 85c, 85c of the piston 85, 86, while the upper end 85b, 86b is at the rod 85d, 86d of the piston 85, 86.

The opposite configuration is also included in the possible configurations, in which the lower end 85a, 86a is at with the rod 85d, 86d of the piston 85, 86, while the upper end 85b, 86b is at the liner 85c, 85c of the piston 85, 86.

Said first and second pistons 85, 86 are configured to move in at least two possible configurations.

A first configuration involves bringing both the first and second piston 85, 86 into the same extended or retracted position.

In that case, the pistons 85, 86 move symmetrically.

This makes it possible in particular to rotate the first rotation device 81 about the transverse axis X.

A second configuration involves bringing the first and second pistons 85, 86 into a different extended or retracted position.

In this case, the pistons 85, 86 move independently of each other.

This makes it possible in particular to rotate the second rotation device 82 according to the longitudinal axis Y.

Therefore, depending on the positions reached by the two pistons 85 and 86, different rotations are possible.

For example, in order to rotate the first rotation device 81, the two pistons 85, 86 are extracted by the same length until the desired rotation about the transverse axis X is reached; subsequently, if the second rotation device 82 also needs to be rotated, only one of the two pistons 85, 86, from the position previously reached performs a further extraction or retracts until the desired rotation about the longitudinal axis Y is reached.

The operation can also occur vice versa, i.e. in a first step, in order to rotate the second rotation device 82, only one of the two pistons 85, 86, performs an extraction until the desired rotation about the longitudinal axis Y is reached, then, if the first rotation device 81 also needs to be rotated, both pistons 85, 86 are extracted by the same length until the desired rotation about the transverse axis X is reached.

This pipe-laying machine 100 is made even more flexible in its operation by the fact that the base 10 can be rotatably mounted onto the levelling mechanism 80.

In particular, the base 10 can rotate about the axis of rotation Z orthogonal to the base 10.

This allows the base 10 and everything installed on it to be rotated. For example, the boom 20, which generally works being arranged transversely to the track assemblies 60, can be rotated by 180° and move to the opposite position, or by 90° and move in the advancement direction, for example.

The position of the boom 20 in the advancement direction can have advantages, especially when there is no pipeline being gripped, e.g. to improve the stability of the machine 100 that has to operate in difficult terrain.

The position of the boom 20 in the advancement direction can also be advantageous for transporting the machine 100, so that it is within the outline and the boom 20 does not necessarily have to be disassembled.

Therefore, according to a preferred embodiment, the machine 100 comprises a rotating device 90.

Said rotating device 90 is preferably interposed between the levelling mechanism 80 and the base 10 and is configured to rotate said base 10 about an axis of rotation Z orthogonal to the base 10.

As shown in the figure, the rotating device 90 can be mechanically connected below the second rotating device 82 and above the base 10.

Said rotating device 90 may comprise a slewing ring with one ring mechanically connected to the second rotating device 82 and one mechanically connected to the base 10.

Additionally, said rotating device 90 may respectively comprise one or more electric or hydraulic drive devices for handling.

The subject matter of the invention also includes the method for laying pipelines, in particular in the construction of gas, oil and water pipelines, which envisages, a pipe-laying machine 100 comprising the central body 30 to which two track assemblies 60 are mechanically connected for moving said central body 30 adapted to support the base 10 on which at least the boom 20 configured for moving/lifting/laying the pipe is installed.

Said boom 20 is preferably adapted to rotate on said base 10 away from/towards the ground by lifting means 70 comprising the main winch 71.

A control cab 50 suitable to house an operator is preferably installed on the base 10.

Said method preferably involves adapting the machine 100 to the inclination of the ground by inclining said base 10 with respect to the track assemblies 60, according to the longitudinal axis Y parallel to the direction of advancement of said track assemblies 60 and/or according to the transverse axis X orthogonal to the direction of advancement of said track assemblies 60.

Preferably, the method involves tilting the base 10 so that said base 10 remains horizontal whatever the slope of the support area 61, i.e. the ground.

The method can optionally include rotating the base 10 with respect to the axis of rotation Z orthogonal to the base 10 itself.

According to a preferred operating mode, the method involves rotating the base 10 about the longitudinal axis Y and/or the transverse axis X and/or about the axis of rotation Z so that the center of gravity B of the machine 100 falls within the support area 61 of the track assemblies 60. This ensures that the machine 100 does not tip over.

Preferably, said method involves gripping and/or laying the pipe with the base 10 rotated about the axis Z so that the boom 20 is arranged transverse to the direction of travel of the track assemblies 60.

According to an advantageous aspect of the invention, said method involves moving the first and second pistons 85, 86 symmetrically to rotate the base 10 about the transverse axis X.

Advantageously, it involves moving the first and second pistons 85, 86 asymmetrically to rotate the base 10 about the longitudinal axis Y.

It in any case is intended for that described above to be given by way of non-limiting example; therefore, possible detail variants that may be required for technical and/or functional reasons are considered from now as to fall within the same protective scope defined by the claims below.

The invention claimed is:

1. Pipe-laying machine for laying pipes in the construction of gas, oil and water pipelines, the pipe-laying machine comprising a central body to which two track assemblies are mechanically connected, for its movement said central body being adapted to support a base on which at least the following are installed:

a boom configured to move/lift/position the pipe, lifting means for handling the boom comprising a main winch, a control cab suitable to house an operator, wherein said boom comprises a first end pivoted on said base and a second end, connected to a control cable of said lifting means, adapted to wind/unwind itself on the main winch in order to rotate said boom carrying the second end away from/towards the ground, wherein between said base and said central body a levelling mechanism is interposed adapted to tilt said base with respect to the track assemblies, according to a longitudinal axis oriented in the direction of advancement of said track assemblies and/or according to a transverse axis orthogonal to the direction of advancement of said track assemblies wherein the levelling mechanism comprises a first rotation device rotatable about the transverse axis and a second rotation device rotatable about the longitudinal axis, wherein the levelling mechanism comprises a first and a second piston configured to rotate both the first rotation device and the second rotation device, and wherein said first and second pistons, when operated in unison, rotate the base about the transverse axis and, when operated independently of one another, rotate the base about the longitudinal axis.

2. The pipe-laying machine according to claim 1, wherein the first rotation device is placed below the second rotation device towards the support area of the track assemblies.

3. The pipe-laying machine according to claim 1, wherein the first rotation device comprises a first structure rotatably pivoted on the central body.

4. The pipe-laying machine according to claim 1, wherein the second rotation device comprises a second structure rotatably pivoted on the first structure of the first rotation device.

5. The pipe-laying machine according to claim 4, wherein the base is mechanically connected to the second structure of the second rotation device.

6. The pipe-laying machine according to claim 1, wherein the first and second pistons comprise a lower end pivoted to the central body and an upper end pivoted to the second structure.

7. The pipe-laying machine according to claim 1, wherein the first rotation device rotates about the transverse axis which is positioned beyond a centerline of the length of the track assembly towards a front portion of the pipe-laying machine considering the front-end of the track assembly.

8. The pipe-laying machine according to claim 1, wherein the second rotation device rotates about the longitudinal axis which is positioned inclined with respect to the support area of the track assembly and incident towards a front portion of the pipe-laying machine when the base is parallel to the support area of the track assemblies.

9. The pipe-laying machine according to claim 1, wherein the base is rotatably mounted on the levelling mechanism with respect to an axis of rotation orthogonal to the base and by means of a rotating device interposed between the levelling mechanism and the base in particular said rotating device being mechanically connected below the second rotation device and above the base.

10. The pipe-laying machine according to claim 1, wherein the first end of the boom is pivoted on the base near a perimeter side and the second end of the boom comprises second lifting means adapted to engage with the pipe.

11. Method for laying pipes in the construction of gas, oil and water pipelines, said method comprising:

providing a pipe-laying machine according to claim 1, adapting the machine to an inclination of the ground by tilting the base with respect to said track assemblies according to a longitudinal axis parallel to an advancement direction of said track assemblies and/or according to a transverse axis orthogonal to the advancement direction of said track assemblies remains horizontal no matter the slope of the support area or ground.

12. The method according to claim 11, wherein the base is rotated about the longitudinal axis and/or the transverse axis and/or about the axis of rotation, particularly orthogonal to the base itself, so that the center of gravity of the machine falls within the support area of the track assemblies.

13. The method according to claim 11, wherein the first and second pistons are moved symmetrically, to rotate the base about the transverse axis, and wherein the first and second pistons are moved asymmetrically, to rotate the base about the longitudinal axis.

\* \* \* \* \*